US012703175B2

(12) United States Patent
Driehuis

(10) Patent No.: US 12,703,175 B2
(45) Date of Patent: Aug. 11, 2026

(54) AUTOMOTIVE WINDOW LAMINATE STRUCTURE, THERMOPLASTIC LAMINATED SHEET STRUCTURE FOR USE THEREIN AND TRANSPORT VEHICLE PROVIDED WITH THE SAME

(71) Applicant: AUTOGLAS D & K B.V., Alphen aan den Rijn (NL)

(72) Inventor: Bartholomeus Leonardus Marinus Borcherd Driehuis, Alphen aan den Rijn (NL)

(73) Assignee: AUTOGLAS D & K B.V., Alphen aan den Rijn (NL)

( * ) Notice: Subject to any disclaimer, the term of this patent is extended or adjusted under 35 U.S.C. 154(b) by 249 days.

(21) Appl. No.: 18/698,959

(22) PCT Filed: Sep. 19, 2022

(86) PCT No.: PCT/NL2022/050525

§ 371 (c)(1), (2) Date: Apr. 5, 2024

(87) PCT Pub. No.: WO2023/059182

PCT Pub. Date: Apr. 13, 2023

(65) Prior Publication Data

US 2025/0010586 A1 Jan. 9, 2025

(30) Foreign Application Priority Data

Oct. 7, 2021 (NL) ..................................... 2029331

(51) Int. Cl.
*B32B 17/10* (2006.01)
*B60J 1/00* (2006.01)
(Continued)

(52) U.S. Cl.
CPC .. *B32B 17/10495* (2013.01); *B32B 17/10036* (2013.01); *B32B 17/10559* (2013.01);
(Continued)

(58) Field of Classification Search
CPC ........ B32B 17/10495; B32B 17/10036; B32B 17/10559; B32B 17/10761;
(Continued)

(56) References Cited

U.S. PATENT DOCUMENTS

| | | | | |
|---|---|---|---|---|
| 5,320,893 A * | 6/1994 | Floyd | B32B 27/08 428/458 |
| 8,995,039 B2 * | 3/2015 | Bartug | C03C 17/3639 359/247 |

(Continued)

FOREIGN PATENT DOCUMENTS

| | | |
|---|---|---|
| EP | 0839644 A1 | 5/1998 |
| WO | 2020022177 A1 | 1/2020 |
| WO | 2020083562 A1 | 4/2020 |

*Primary Examiner* — Sharrief I Broome
(74) *Attorney, Agent, or Firm* — The Webb Law Firm

(57) ABSTRACT

An automotive window laminate structure, including first and second parallel and mutually spaced apart glass sheets and a thermoplastic laminated sheet structure. The laminated sheet structure is placed between the first and second glass sheet, and the laminated sheet structure includes at least one functional layer with an upper and lower surface, at least two bonding layers, with the bonding layers covering the upper and lower surfaces of the functional layer. A portion of the bonding layers extends beyond the perimeter of the functional layer and an encapsulation layer is located between the first and second glass sheet, such that the encapsulation layer extends along the perimeter of the functional layer.

20 Claims, 7 Drawing Sheets

(51) Int. Cl.

| | |
|---|---|
| ***G02F 1/1334*** | (2006.01) |
| ***G02F 1/153*** | (2006.01) |
| ***G02F 1/169*** | (2019.01) |

(52) U.S. Cl.
CPC .... *B32B 17/10761* (2013.01); *B32B 17/1077* (2013.01); *B60J 1/001* (2013.01); *B32B 2605/00* (2013.01); *G02F 1/1334* (2013.01); *G02F 1/153* (2013.01); *G02F 1/169* (2019.01)

(58) Field of Classification Search
CPC .. B32B 17/1077; B32B 2605/00; B60J 1/001; G02F 1/169; G02F 1/1334; G02F 1/153
USPC .......................................................... 359/238
See application file for complete search history.

(56) References Cited

U.S. PATENT DOCUMENTS

| | | | |
|---|---|---|---|
| 9,333,728 | B2 * | 5/2016 | Veerasamy ......... C03C 17/3644 |
| 2002/0094407 | A1 | 7/2002 | Frost et al. |
| 2003/0143371 | A1 * | 7/2003 | Conway ............ B32B 17/10302 428/209 |
| 2021/0246960 | A1 | 8/2021 | Yamaoka |
| 2021/0379968 | A1 | 12/2021 | Do Rosario et al. |

* cited by examiner

AUTOMOTIVE WINDOW LAMINATE STRUCTURE, THERMOPLASTIC LAMINATED SHEET STRUCTURE FOR USE THEREIN AND TRANSPORT VEHICLE PROVIDED WITH THE SAME

CROSS-REFERENCE TO RELATED APPLICATIONS

This application is the United States national phase of International Application No. PCT/NL2022/050525 filed Sep. 19, 2022, and claims priority to the Netherlands Patent Application No. 2029331 filed Oct. 7, 2021, the disclosures of which are hereby incorporated by reference in their entireties.

BACKGROUND OF THE INVENTION

Field of the Invention

The present invention is related to an automotive window laminate structure, a thermoplastic laminated sheet structure for use in an automotive window laminate structure, and to a transport vehicle provided with an automotive window laminate structure according to the invention.

Nowadays, thermoplastic laminated sheet structures comprising at least one functional layer like polymer-dispersed liquid-crystal (PDLC), Electro Chrome and other functional films like suspended-particle devices (SPD) are widely used in architectural glasses but are—more exceptionally—also used in the automotive industry. There are several reasons for that but in general, in the automotive industry, there is a higher demand in both safety regulations and quality issues. As an example, homologation in the automotive industry requires destructive tests, such as dropping steel balls from a height onto the window laminate structure, but also less destructive tests such as optical performance and boiling tests, to be passed.

DESCRIPTION OF RELATED ART

Currently, most thermoplastic laminated sheet structures comprising a functional layer are laminated by means of a bonding layer composed out of ethylene-vinyl acetate (EVA), due to its good bonding properties with plastics, such as for example Polyethylene terephthalate (PET). The present invention is however not limited to these exemplary materials. Additionally, EVA has a very low viscosity when heated, which allows it to easily flow into openings/gaps between layers of the thermoplastic laminated sheet structure during laminating, in particular if these openings/gaps become larger. However, EVA is known to have a low quality in terms of optical performance, meaning that it remains hazy, thus slightly opaque, but will also contains more optical distortion than the use of high viscous laminating agents would give. This is not desired in car window structures. Moreover, EVA has a relatively low strength, which makes it difficult to pass the safety tests for automotive windows, in order to compensate for the low strength, usually a thicker layer of PET is used in the thermoplastic laminated sheet structure in order to fulfil the strength tests automotive windows are subjected to. However, even though the test may be successful, the thicker PET layers may increase the weight of the automotive window laminate significantly. As an alternative, Polyvinyl butyral (PVB) may be used as bonding layer during the laminating process. PVB is known to have significantly better optical performance over EVA and is also stronger compared to EVA. Therefore, when using PVB a reduction in weight of the automotive window laminate structure may be realized. However, since PVB is less viscous when heated, it tends to not be able to level out the openings/gaps between the layers of the thermoplastic laminated sheet structure. This also makes it necessary the use of an edge seal to close-in and/or provide a barrier for the Polymer dispersion to the conductive film.

In general, the thermoplastic laminated sheet structure, and in particular the functional layer thereof, does not stretch all the way to the edges of the glass sheets of the automotive window laminate structure. In fact, an encapsulation of the perimeter of the thermoplastic laminated sheet structure is mandatory for automotive glass. This is generally done by cutting a 0.38 mm bonding layer to the size of the functional layers perimeter. In particular the area where there is no functional layer allocated between the sheets of glass, the openings/gaps in these areas need to be compensated for in terms of thickness. The reason that the functional layer, and preferably also conductive coating of a thermoplastic layer, does not extend all the way to the edge of the sheets of glass is mainly to prevent the weather conditions, moisture, oxygen, salt (from coastal environment, or from de-icing of roads), window wiping liquid, and the like to get in contact with the functional layer or with the conductive coating of any layers thereof. Such a contact between the environment and the thermoplastic laminated structure may cause malfunctioning of the laminated structure, or even causes it to stop functioning at all. It is especially important to fill the previously mentioned opening/gap where the functional layer does not extend to the perimeter of the glass sheet of the window in case a relatively thick functional layer is used. Which is even more important when PVB and/or TPU is used, since PVB and TPU has a higher viscosity. The need for filling said opening/gap becomes more important when the thickness of the functional layer increases. Moreover, the need for filling said opening/gap depends not only on the thickness of the functional layer but may also be related to the thickness of the glass, the distance between the perimeter of the functional layer and the perimeter of the glass, the shape of the glass, and so on. Not filling said opening/gap may cause the sheets of glass to crack or break locally due to uneven pressure distribution in the glass during lamination. In essence, what happens is that the perimeter of the functional layer functions as a folding line, over which line the glass folds due to the forces resulting from the vacuum applied during laminating. If the sheets of glass bend too much, they may break/crack consequently. However, it is also conceivable that, due to not filling said opening/gap, a local air gap may be trapped in between the sheets of glass in case they do not break or crack. Obviously, all these effects are unwanted. Especially this is the case in automotive industries, where the use of thin glass nowadays is the standard.

Therefore, in the automotive industry spacing the functional layer from the edges of the sheets of glass is realized by means of a frame layer. Such frame layer fills the aforementioned opening/gap, preferably everywhere where the functional layer does not extend to the edges (the trim) of the glass sheets. As such, it is possible to utilize PVB as a bonding material, even due to its higher viscosity during laminating, mainly since the gap is filled by the frame layer. However, said frame layer may also have some major disadvantages. First, the frame layer needs to be bought in a fitting shape, i.e., a shape that fits the perimeter of the functional layer. Shaping the frame layer is normally a labour-intensive job and has to be carried out accurately. Furthermore, need the functional layer and the frame layer to be attached to a base layer (which may be one of the PVB bonding layers). Also, this attachment has to be performed accurately, among others to prevent any local overlap of the functional layer and the frame layer. Such overlap is also referred to a "mis stacking" and might result in breakage or damage of the functional layer. Due to the specific demands, it is difficult to automate production and fitting of the frame layer.

SUMMARY OF THE INVENTION

It is therefore a goal of the present invention to provide an automotive window laminated structure that may be produced more efficient and/or without the drawbacks of the existing production techniques.

The present invention is able to achieve this goal by providing an automotive window laminate structure, comprising a first glass sheet, and a second glass sheet, said first and second glass sheet are parallel and mutually spaced apart, a thermoplastic laminated sheet structure, said laminated sheet structure substantially entirely placed between the first and second glass sheet, said laminated sheet structure comprising at least one functional layer, having an upper and lower surface, at least two bonding layers, wherein the at least two bonding layers substantially entirely cover the upper and lower surfaces of the at least one functional layer, wherein a portion of the bonding layers extends beyond a portion of the perimeter of the functional layer, an encapsulation layer, at least partially located between the first and second glass sheet, which encapsulation layer extends along at least a portion of the perimeter of the functional layer, preferably the portion of the perimeter the bonding layers extend beyond, wherein at least a part of the encapsulation layer is formed by an inactive portion of the functional layer.

Since at least a part of the encapsulation layer is formed by an inactive portion of the functional layer, the need for the frame layer may at least be partially eliminated. Hence, allowing an easier production of the automotive window laminate structure. Mainly since the burden of careful positioning of the frame layer, or in the case of the present invention the encapsulation layer, with respect to the functional layer may be substantially reduced by the present invention. The encapsulation layer in this respect may fill the opening/gap (or at least a part thereof) between the sheets of glass, preferably between the bonding layers, at those locations where a functional part of the functional layer lacks. The term "a part of the encapsulation layer" should in respect of the present invention be understood as a part sufficiently large to realize the advantages of an easier manufacturing process. Hence, it may be conceivable that the encapsulation layer that is formed by the inactive portion of the functional layer extends only along one side edge, or even only half of a side edge of the perimeter of the functional layer, in particular if e.g., the thermoplastic layer is only used to serve as a connector, in particular a multi-track connector. This already may realize the benefit of the present invention since the remainder of the encapsulation layer can be easily connected to the remaining portion of the perimeter of the functional layer. Alternatively, it is possible that the remainder of the perimeter of the functional layer, i.e., the part of the perimeter not surrounded by encapsulation layer, remains substantially free of an encapsulation layer. That is, only a part of the perimeter of the functional layer may be provided with the encapsulation layer, wherein the encapsulation layer is positioned such that it maintains a position of the functional layer with respect to the first and second sheet of glass. Preferably, the functional layer according to the present invention is an adjustable functional layer, such as a switchable functional layer.

The present invention also provides a thermoplastic laminated sheet structure, said laminated sheet structure may substantially entirely be placed between the first and second glass sheet, whereby the laminated sheet structure may comprise at least one functional layer, having an upper and lower surface, at least two bonding layers, wherein the at least two bonding layers substantially entirely cover the upper and lower surfaces of the at least one functional layer, wherein a portion of the bonding layers extends beyond a portion of the perimeter of the functional layer, an encapsulation layer, which encapsulation layer extends along at least a portion of the perimeter of the functional layer, preferably the portion of the perimeter the bonding layers extend beyond, wherein at least a part of the encapsulation layer is formed by an inactive portion of the functional layer. Moreover, the invention also provides a functional layer comprising at least two thermoplastic layers, and at least one film layer between the at least two thermoplastic layers, wherein at least a portion of said functional layer is an inactive portion, wherein the inactive portion is preferably formed by a locally cut-out portion of at least one thermoplastic layer. The skilled person will realize that these embodiments according to the present invention may be used separately or in combination with any of the embodiments presented in the present application, in particular embodiments related to the thermoplastic laminated sheet structure. Hence, all features appended to the thermoplastic laminated sheet structure may also be applied towards the thermoplastic laminated sheet structure alone, that is, separate from the automotive window laminate structure.

Preferably, the encapsulation layer is entirely formed by the inactive portion of the functional layer. This is especially beneficial since the need for a frame layer according to the prior art may entirely be substituted. According to this embodiment the need for a separate encapsulation layer may be prevented. That is, since the entire encapsulation layer is formed by an inactive portion of the functional layer, said inactive portion, which forms the encapsulation layer, allows to retain the position of the functional portion with respect to the sheets of glass, and/or with respect to the two bonding layers. To this end, at least a part of the perimeter of the inactive portion, or the encapsulation layer, may be aligned with the perimeter of the two bonding layers. This allows to position the entire thermoplastic laminated sheet structure between the sheets of glass easily, without the need to firstly position a frame around the functional layer. Preferably, the inactive portion of the functional layer is already created during manufacturing thereof. This allows to directly form the thermoplastic laminated sheet structure and may eliminated the need to first position the functional layer on one of the bonding layers, and subsequently and very carefully positioning a frame layer around the functional layer, before placing the second bonding layer on top thereof. Instead, the functional layer having the inactive portion may be aligned with the two bonding layers at its perimeters easily. Hence, the entire step of placing a frame layer and positioning said frame layer may be eliminated since the encapsulation layer is entirely formed by the inactive portion of the functional layer. Preferably, said inactive portion is at least partially, preferably substantially entirely electrically insulated. This allows for providing conductive circuits on the insulated portion for connecting the anode and cathode to a power source. In particular, if applied, when multiple active segments are present it becomes possible to provide a plurality of conductive circuits onto said insulated part of the inactive portion of the functional layer. Preferably, said functional layer comprises at least one, preferably two thermoplastic sheets. It is preferred that mutually facing sides of said thermoplastic sheets are provided with a conductive coating, such as for example an ITO coating, in particular a 20-150 nm thin ITO coating. Between said thermoplastic sheets, at least one switchable film, in particular a 2-100 micron thin switchable film, such as Electro-Chrome, PDLC, SPD, or a similar film, is deposited. At least a portion of said functional layer can be inactive. This may be the case when, for example, locally a portion of the conductive coating, and/or the switchable film, and/or at least one thermoplastic layer is removed and/or electrically separated. This may be achieved by locally removing the "switchable" functionality of the functional layer, whilst allowing said inactive portion to remain attached to said functional layer, such as for example to be integral. Said inactive portion as such preferably forms at least a portion of the encapsulation layer. According to a preferred embodiment of the functional layer, one thermoplastic layer extends at least beyond the perimeter of the switchable film, and/or the second thermoplastic layer. Said portion extending beyond the perimeter, in particular an upper surface thereof, comprises at least one non-conductive area and/or an electrically insulated portion. In this respect upper surface may be understood as the surface of the portion extending beyond the perimeter that is inwardly facing. Hence, said upper surface is at least partially free of conductive coating and/or provided with insulating material. This allows said portion that is at least partially free of conductive coating and/or provided with insulating material to serve as a substrate for a conductive circuit. In particular conductive circuits, more preferably, flexible printed circuits (FPC) for connecting the switchable film to a power source. The portion that is at least partially free of conductive coating and/or provided with insulating material is in particular beneficial since it prevents electrical shortcuts of the functional layer by the conductive circuits. Additionally, this inactive portion as such may simultaneously form a portion of the encapsulation layer. Removing the conductive coating of the thermoplastic layers may be achieved either by means of a laser, which is to be done after the conductive coating is applied. Alternatively, it is possible to prevent the conductive coating to be attached to the thermoplastic layer in specific areas. The latter may be achieved via a silkscreen that prevents the conductive coating from being applied in certain areas of the thermoplastic layer. Yet, it is also conceivable that the conductive coating is provided with an insulating material. This may allow the conductive circuit, or tracks, to be provided onto the insulating material whilst not causing electrical shortage.

It is preferred that the bonding layers, or at least one bonding layer, are at least partially composed out of Polyvinyl Butyral (PVB) and/or TPU. The present invention has especially turned out to be advantageous if the bonding layers are at least partially composed from PVB. This is due to the higher viscosity of PVB and TPU at the laminating temperature, which increases the need for an encapsulation layer. Since the need for an encapsulation layer sets forth that accurate placement thereof is required in case the encapsulation layer is a loose layer, i.e., a frame layer, and hence if PVB and/or TPU is applied as bonding layer use of the present invention allows easier production. This may be caused since at least a part of the encapsulation layer is formed by an inactive portion of the functional layer. It is however also conceivable that one bonding layer is at least partially composed out of PVB, whereas the second bonding layer is at least partially composed out of Thermoplastic polyurethane (TPU). Since TPU and PVB are compatible to each other while each having different properties. TPU for example has low migration of its own elements at elevated temperatures, but also allows for easy adding soft and/or hard crosslinking agents to set mechanical properties. PVB on the other hand allows for easy tinting. Hence combining the two different bonding layers may yield a synergetic advantage.

In a preferred embodiment the at least one functional layer comprises at least two thermoplastic layers, and at least one film layer, which may also be referred to a switchable film, between the at least two thermoplastic layers. Preferably, at least a part of at least one thermoplastic film extends beyond the perimeter of the at least one film layer. Preferably, the at least one thermoplastic film extends at least 2 mm, preferably at least 3 mm, more preferably at least 5 mm beyond the at least one film layer. The thermoplastic film may also extend up to 12 mm or more beyond the film layer. Since at least one thermoplastic layer extends beyond essentially the remainder of the functional layer a better seal of functional layer may be realized. The seal may be realized by the bonding layers and may prevent moisture to enter through the permeable materials of the functional layer. Additionally, since the thermoplastic laminate extends further than the film layer, and the second thermoplastic layer, the gap that the bonding layers should fill during laminating is smaller, which may therefore be easier to fill. To this end, at least one thermoplastic film may be removed from the functional film by for example a laser, preferably also the film layer is removed, hence leaving at least one thermoplastic layer intact, which thus extends beyond the other layers of the functional layer. It is conceivable that at least one thermoplastic layer extends essentially entirely to the perimeter of at least one bonding layer. Preferably the thermoplastic layer that extends beyond the film layer and the other thermoplastic layer extends essentially entirely to the perimeter of at least one bonding layer. That is, preferably to the perimeter of the bonding layer adjacent to the thermoplastic layer that extends beyond the remainder of the functional layer. Said thermoplastic layer may for example be within 0-3 mm, preferably 0-1 mm of the edge of the bonding layer of the sheet. It is also conceivable that said thermoplastic layer extends to 0-1 mm from the perimeter of at least one sheet of glass. In said latter case, it is preferred that the bonding layer extends entirely to the perimeter of the glass sheet. If the thermoplastic layer extends to this end, it may be easier to locate the functional layer correctly with respect to the bonding layers and the sheets of glass. Preferably, if the at least two thermoplastic layers are not of equal thickness, the thinnest is removed such that the thickest extends beyond the film layer.

It is imaginable that at least one thermoplastic layer extends at least 10 mm beyond the switchable film and/or the second thermoplastic layer. Preferably said portion extending beyond is at least partially inactive, and hence may form a portion of the encapsulation layer. Preferably, the functional layer comprises at least one connecting substrate, configured for connecting the functional layer to at least one power source and/or switching source. Said at least one power source and/or switching source may be an external power source such as a car battery and/or a processing unit. Preferably, the connecting substrate is at least partially integrally formed with the functional layer, in particular an inactive portion thereof. It is conceivable that the portion, preferably the inactive portion, extending beyond the switchable film and/or second thermoplastic layer forms at least a portion of the substrate. Onto said substrate at least one conductive portion may be applied, preferably at least two mutually separated conductive portions. Said conductive portions may be traces or tracks, for establishing an electric connection between an anode and/or cathode of the functional layer and an external power source. Preferably, the substrate is at least partially free of ITO. This may be achieved by removing the ITO coating from the thermoplastic layer partially and/or by preventing the ITO coating to be applied on a portion of the thermoplastic layer. Preferably, at least one thermoplastic is thicker compared to the second thermoplastic layer. In particular the thermoplastic layer that extends beyond the other thermoplastic layer is thicker. This allows for better printing and/or applying of the electric tracks, and/or connections to the anode and/or cathode of the functional layer. Also, since one thermoplastic layer is relatively thin compared to the other thermoplastic layer, the bonding layer will be able to fill the gap once this thin thermoplastic layer is removed. That is, so as to form the cascaded portion. It is to this end conceivable that one thermoplastic layer has a thickness of about 50 micron, whereas a second thermoplastic layer has a thickness of about 180 micron. Preferably, the thinner thermoplastic layer is situated adjacent to a bonding layer which is at least partially composed out of TPU, which allows for a better seal of the functional layer. TPU comprises fewer migrating elements and therefore provides for an improved seal of the functional layer, at least the switchable film thereof. This is in particular beneficial in case a cascaded portion is present, as described in the present invention. The term anode and cathode are to explain for the current flow. Switchable films like PDLC and SPD however are not sensitive for polarization and can therefore also be connected the other way around. Hence when the application specifies anode and cathode this may also be understood as cathode and anode respectively.

The extending thermoplastic layer essentially may form a cascading portion. Said cascading portion, formed by the thermoplastic layer that extends beyond the film layer or switchable film and the other thermoplastic layer, may be located at a part of the perimeter of the inactive part of the functional layer. That is, the cascading portion may be located at the perimeter of the functional layer, and preferably is located in at least a part of the inactive part of the functional layer.

Preferably, the thermoplastic layer is at least partially composed from polyethylene terephthalate (PET), and/or polyethylene naphthalate (PEN), and/or Tri Acetate Cellulose (TAC) and/or Poly methyl methacrylate (PMMA). The at least one film layer may be in particular a polymer-dispersed liquid-crystal device, and/or a suspended-particle devices, and/or an electrochromic device, and/or micro-blinds. However, the present invention is not limited to only these examples. In fact, any functional film may be used in respect of the general inventive concept of the present invention. Preferably, at least one side of at least one thermoplastic layer is provided with a conductive coating, preferably Indium Tin Oxide (ITO). More preferably, one side of both thermoplastic layers is provided with a conductive coating, preferably ITO. In particular the sides of the thermoplastic layers facing towards each other are provided with such conductive coating. However, the present invention is not limited to the conductive coating, it is also possible that a conductive layer is provided instead of the coating and/or silver nano wire are applied.

According to a preferred embodiment it is conceivable that a plurality of functional layers is provided. For example, comprising three thermoplastic layers and two switchable films. In this respect a central thermoplastic layer may be provided with a conductive, preferably ITO, coating on both surfaces thereof. It is possible to provide for two different types of switchable films, such as an PDLC and an SPD to provide for different functionalities. Yet, more functional layers may also be conceivable, and the skilled person would readily realize to adjust the number of functional layers to a specific need.

It is furthermore advantageous if the inactive part of the functional layer is at least partially formed by a cut-out portion of the at least one film layer and/or the at least one thermoplastic layer and/or a conductive coating of the thermoplastic layer. The cut-out portion may be a laser cut-out portion. By means of a laser an accurate incision can be made, which will not necessary extend all the way through the functional layer. In this respect, the cut-out portion forms a separation between the at least one film layer and/or the at least one thermoplastic layer and/or a conductive coating of the thermoplastic layer such as to prevent electric shortages and/or electric short circuits. Preferably, the laser is directed perpendicular towards the thermoplastic laminate surface. This prevents delamination of the remaining layers. However, alternative methods for applying a cut-out portion which does not extend all the way though said functional layer, such as e.g., milling, or micro-milling, are also applicable. Preferably, the cut-out portion extends through at least one of the thermoplastic layers and a part of the film layer. As such, the cut-out portion locally cuts through the conductive coating that is applied on at least one, preferably both thermoplastic layers. To this end, it is preferred that the cut-out portion is a consecutive cut-out portion, or at least extending from one point on the perimeter to another, different point on the perimeter of the functional layer. This will yield an inactive portion of the functional layer, in particular the interior portion of the consecutive cut-out portion will form the active portion, or one of the surfaces separated by the cut-out line extending between said points on the perimeter will form the active portion of the functional layer. It may be conceivable that a cutline is provided in the conductive coating of the active portion of the functional layer that is provided on at least one of the thermoplastic layers, said cutline separating the electric fields. Preferably said cutline extends from one side of the perimeter of the active portion of the functional layer to the opposing side of the perimeter of the active portion of the functional layer. Hence, said cutline may separate the active portion in two adjacent separated surfaces of conductive coating. Preferably the two adjacent separated surfaces of conductive coating are equally sized. It is conceivable that in addition to the conductive coating, also the thermoplastic layer is locally deleted. This may be realized by means of a laser cut. Due to the way the cutline forms two or more separated surfaces in the conductive coating, an electric circuit may be formed that allows the connectors to be located on one side of the perimeter of the laminate, one connected to each of the separated surfaces, more in particular to each surface formed on the conductive layer by said cutline. This allows the current to flow from one connector, through one of the at least two separated surfaces of the conductive coating, subsequently through the film layer, then through the still intact conductive coating of the opposing thermoplastic layer, to subsequently flow through the film layer (i.e., the liquid crystals) of the adjacent separated surface, back to the other connector. As such, a circuit is formed which allows the current to activate the liquid crystals to be activated whilst having the connectors of the anode and cathode on the same side of the perimeter, in particular also on the same side of the thermoplastic layer.

In a further preferred embodiment, the inactive portion of the functional layer is an integral part of the functional layer. Hence, in this respect the integral portion may be formed by a part of a thermoplastic layer of the functional layer that is electrically separated from the functional portion of the functional layer. That is, preferably the entire inactive portion of the functional layer is at least partially attached to the active portion of the functional layer. This enables the encapsulation layer to be sufficiently rigid, an additional advantage is that the thickness of said encapsulation layer is essentially identical to the thickness of the functional layer, that is, apart from the local cut-out portion. Hence, the upper and lower surface of the inactive portion of the functional layer are essentially flush with the upper and lower surfaces of the functional layer. Since the inactive portion is integral part of the functional layer additional structural benefits may be realized.

Preferably, the encapsulation layer extends along the entire perimeter of the functional layer. This results in the best positioning of the functional layer, if the entire encapsulation layer is formed by an inactive portion of the functional layer. If the encapsulation layer extends along the entire perimeter of the functional layer a better support of the functional layer, or active portion thereof, with respect to the perimeter of the glass sheets may be realized.

Preferably, the at least two bonding layers extend beyond the perimeter of a part of the functional layer along the entire perimeter of the functional layer. This ensures that the functional layer has an adequate spacing with respect to the edges of the sheets of glass. The entire gap existing between the two bonding layers where they extend beyond the perimeter of the functional layer is preferably filled by the encapsulation layer. However as already stated, it is also possible that only a part of the gap is filled. In this respect in case the entire encapsulation layer is formed by an inactive portion of the functional layer, the functional layer is to be considered to be the functional portion of the functional layer. Hence, in case the entire encapsulation layer is formed by the inactive portion of the functional layer, the at least two bonding layers extend beyond the perimeter of the active portion of the functional layer, preferably along the entire perimeter of the active portion of the functional layer. In the case one thermoplastic layer extends beyond the perimeter of the remainder of the functional layer, in particular the other thermoplastic layer and film layer, it is conceivable that the bonding layers extend beyond at least said remainder portion, but optionally also beyond the thermoplastic layer that extends beyond the film layer.

It is also preferred that the encapsulation layer at least partially fills a space between the bonding layers stretching along the perimeter of the functional layer where the bonding layers extend beyond said perimeter. As elucidated above, the space between the bonding layers stretching along the perimeter of the functional layer where the bonding layers extend beyond said perimeter is preferably entirely filled. This may be realized by means of the encapsulation layer. To this end it is beneficial if the entire encapsulation layer is formed out of an inactive portion of the functional layer, and if the encapsulation layer, or said inactive portion of the functional layer, extends around the entire perimeter of the functional layer. Since the upper and lower surfaces of the inactive portion of the functional layer are flush with the remainder of the functional layer, this allows to fill accurately and easily said space. Alternatively, it is also possible, that the mentioned space is filled in a cascading manner. This cascade may be formed out of the inactive portion as well, wherein the height of the inactive portion increases in a direction from the edge of the sheets of glass towards the active portion of the functional layer. These cascades may also be formed by the cut-out portion. For example, a strip of the thermoplastic layer of the functional layer may be removed. Said removed strip of thermoplastic layer may for example be removed by laser cutting and may be removed at the entire inactive portion of the functional layer such that the inactive portion is formed by one thermoplastic layer and one film layer only. Additionally, a strip of the film layer may additionally be removed, wherein the strip of film layer that is removed is located more towards the edge of the sheets of glass compared to the strip of thermoplastic layer that is removed. If the cascade strips are wide enough in a direction from the edge of the glass sheets towards the active portion of the functional layer, the height differences may be accounted for by the bonding layer, in particular PVB and/or TPU. This is possible according to the present invention since the local cut-out portion may be accurately applied.

Preferably, at least a part of the thickness of the encapsulation layer is substantially equal to the thickness of at least a part of the functional layer. This allows the bonding layers to be very thin, since the volume of opening/gap to be filled by the bonding layers decreases significantly. Said bonding layer may form an edge sealing of the thermoplastic laminate. One function for an edge sealing is to give temporary support to the edge of the dispersed Polymer film during the lamination process, to prevent for local delamination at the edge. The cascaded segment may prevent for such local delamination. Hence, no edge sealing must be applied if a cascade edge is used. Preferably, the thermoplastic laminate structure has a cascading edge. Preferably, the cascading edge is formed by the encapsulation layer. To this end, a portion of the encapsulation layer may be removed in a cascading manner. That is, at a part of the inactive portion of the encapsulation layer, in particular a part of one thermoplastic layer and the film layer of the functional layer at the perimeter portion of the inactive portion, is removed for example by means of a laser. This does not result in breakage of the glass sheets, since a cascading structure is formed, and the bonding layer is able to fill this gradually. The cascaded portion further prevents delamination and increases the impermeability of the laminate on the long term. To this matter there is a relationship to the length of the cascade, in particular the portion beyond the perimeter, and the permeability factor of the bonding layer.

In a further preferred embodiment, a part of the inactive portion of the functional layer forms a connector and/or an FPC, for providing power to the functional layer. The inactive portion of the functional layer may as such be used to power the functional layer, in particular the active portion thereof. The connector may be formed by a strip of conductive material attached locally to the part of the inactive portion of the functional layer or may be formed by the inactive portion as such. It is also conceivable that a circuit, that is a conductive conduit, is printed to power functionalities such as LED lights, Near Field Communications (NFC) or other embedded electronics in the functional layer.

Preferably the anode and cathode are provided on the same side of the functional layer, in particular on the inactive portion of the functional layer. Preferably, at least two cut-out notches are provided at opposite sides of the functional layer, preferably overlapping the cutline in the conductive coating, which separates the electric fields. Preferably, said notches extend at least from the perimeter of the functional layer to the cut-out portion of the functional layer. One side of the functional layer is to be understood as on the same edge, wherein the anode and cathode are located at opposite sides of the cut line extending between the cut-out notches. More, it is preferred that the anode and cathode are mutually separated by one of the cut-out notches. Hence, the connector may be formed by the anode and cathode according to this embodiment. Since the anode and cathode are placed on the same side of the functional layer this allows for an easier connection to the electronics of the car wherein the window is placed. The cut-out and cut lines can be repeated, so providing multiple segments which can separately being activated.

Preferably, a conductive circuit is electrically connected to the functional layer of the thermoplastic laminate via at least one connecting part. It is conceivable that said conductive circuit is provided on one of the thermoplastic layers, preferably the thermoplastic layer that is extending beyond the film layer. The conductive circuit may be electrically connected to the conductive coating, such as the ITO coating, of a thermoplastic layer. Said conductive circuit may be formed by a flat and/or flexible printed circuit. It is conceivable that the conductive circuit is formed by a laminated structure, said laminated structure comprising at least two layers of PET and/or polyimide, wherein a conductive layer is located between the layers of PET and polyimide, said conductive layer may be tin, copper, silver, or gold is provided between the layers of polyimide. The conductive circuit may alternative be formed by locally removing the conductive and/or coating layer on the thermoplastic layer. Yet another alternative is that the conductive circuit is a printed conductive circuit, wherein the conductive circuit is printed by a conductive ink on the thermoplastic layer. Preferably, the conductive circuit comprises silver, since this is known for its conductive properties, and/or a tin cladded metal if a better protection against corrosion is required. Said conductive circuit may e.g., be provided on the thermoplastic layer of the functional layer which extends beyond the functional layer, in particular the substrate. The connecting part may for example be formed by a conductive link between the conductive circuit and the conductive coating, preferably the ITO coating, of a thermoplastic layer. It is imaginable that at least one thermoplastic layer of the functional layer extends partially beyond the other thermoplastic layer and/or the switchable film. Preferably said portion extending beyond forms a substrate, wherein said substrate is preferably free of ITO coating. The conductive circuit may be provided onto the portion of the thermoplastic layer that extends beyond the remainder of the functional layer, in particular onto the substrate. Since the ITO (or similarly functioning alternative) coating is partially removed from this portion of the thermoplastic layer (substrate) no electric shortage and/or electric short circuit will occur whilst simplifying the way to electrically connect the functional layer.

Optionally, the functional layer comprises at least two, preferably a plurality of active segments. Each of said active segments may be separated by means of a cutline as described in the present invention. Said cutline provides for a separation (locally) of the ITO coating (or similar alternative coating) between the adjacent segments. This prevents electric shortage and/or electric short circuit from occurring when one segment is activated. This allows the connectors to be located all on the same side of the perimeter of the functional film. Preferably, the at least two active segments, preferably each of the active segments are independently connected to a connecting part of the conductive circuit, allowing each active segment to be selectively electrically connected to the conductive circuit. Said conductive circuit may in this respect be a special flexible printed circuit as described, which comprises at least two, preferably a plurality of unique conductive channels in the conductive layer, such that each conductive channel may be connected to a unique active segment. Preferably, the functional layer comprises two or more connectors, and/or combined connectors. Preferably, each connector is configured to connect an active surface to a power source. Preferably, all connectors are on the same edge of the perimeter of the functional layer. This allows for a more compact design.

Preferably, one inwardly facing surface of at least one thermoplastic layer of the functional layer is provided with one or more cutlines. Preferably said cutline locally physically separates adjacent surfaces of the ITO coating (or similar alternative coating). This allows to form multiple segments. The cutlines are preferably shaped lines, but may also be partially curved and/or straight. Hence, a total of two cutlines may provide for a total of three independently controllable active segments of said functional layer. It is imaginable that at least two or more, preferably substantially parallel, cutlines are provided for providing at least three parallel active segments. Said cutlines, as described in the application separate the conductive coating applied onto the thermoplastic layer such as to prevent electrical shortage. It is also conceivable that both of the thermoplastic layers of the functional layer are provided with one or more cutlines, such that both thermoplastic layers comprise at least two or more mutually separated surfaces of ITO coating. Preferably said two thermoplastic layers with two or more ITO surfaces are substantially parallel to each other and the cutlines of both thermoplastic layers are at an angle, preferably such as to mutually cross. As such, it may become possible to form switchable segments which may represent pixels. That is, the two ITO surfaces of both thermoplastic layer may establish four active segments which are oriented as pixels on the functional layer. Although the present application describes cutlines, it is also conceivable that alternative ways to achieve the separated surfaces of ITO coating (or similar coating) are available, which are not excluded by the present invention. Cutline does therefore not necessarily involve cutting, such as with a laser, through the ITO coating, but may also be understood as merely applying two separated surfaces of ITO coating. Where, in this application cutline is mentioned, this may also be referred to as a separation line. In particular such a separation line locally separates two surfaces of conductive coating.

Preferably a non-conductive layer is provided on top of the conductive circuit. This non-conductive layer may prevent a short circuit in the conductive circuit. Said non-conductive layer may for example be an adhesive non-conductive tape, or may be printed on the conductive circuit with a non-conductive material. Such a non-conductive tape may be a Kapton tape that covers the conductive circuit. Yet, it may also be conceivable that this embodiment, comprising the non-conductive layer on top of the conductive circuit is applied in reverse order. That is, providing a non-conductive layer on top of the conductive coating of the thermoplastic layer, and providing the conductive circuit on top of the non-conductive layer. As such, electrical shortage may also be prevented while still allowing all connectors to be on the same side of the perimeter of the functional layer as well as on the same side of the thermoplastic layer. It is also conceivable that the tracks and/or connections to the anode and cathode of the functional layer are provided onto the thermoplastic layer that extends beyond the functional layer, and an external, preferably weather durable connector is connected to the tracks and/or connections. This protects the tracks or connections from the environment. Said external, preferably weather durable, connector may also be a flexible printed circuit.

It is conceivable that at least one bonding layer seals at least a part of the functional layer, preferably said at least one bonding layer impermeable seals said part of the functional layer. Preferably said at least one bonding layer impermeable seals a film layer situated between the two thermoplastic layers. Preferably the at least one bonding layer prevents moisture from entering the film layer. This may prevent the degradation of the functional layer since this is prone to moisture. The seal may for example be established during the laminating process as the bonding layer becomes more viscous. By sealing the functional layer with the at least one bonding layer, it is not necessary to apply an edge seal in the form of a tape or the like prior to starting the laminating process. This embodiment has been proven particularly suitable in combination with the cascaded edge of the functional layer, that is wherein one thermoplastic layer extends beyond the film layer and the other thermoplastic layer.

The present invention is further related to a thermoplastic laminated sheet structure according to the invention for use in an automotive window laminate structure. The present invention is further related to a transport vehicle, such as a car, bus, or a truck, provided with an automotive window laminate structure according to the present invention.

BRIEF DESCRIPTION OF THE DRAWINGS

The terms Fig., Figs., Figure, and Figures are used interchangeably in the specification to refer to the corresponding figures in the drawings.

The present invention will be further elucidated with reference to the non-limitative embodiments shown in the following figures, wherein.

DESCRIPTION OF THE INVENTION

Figure 1:
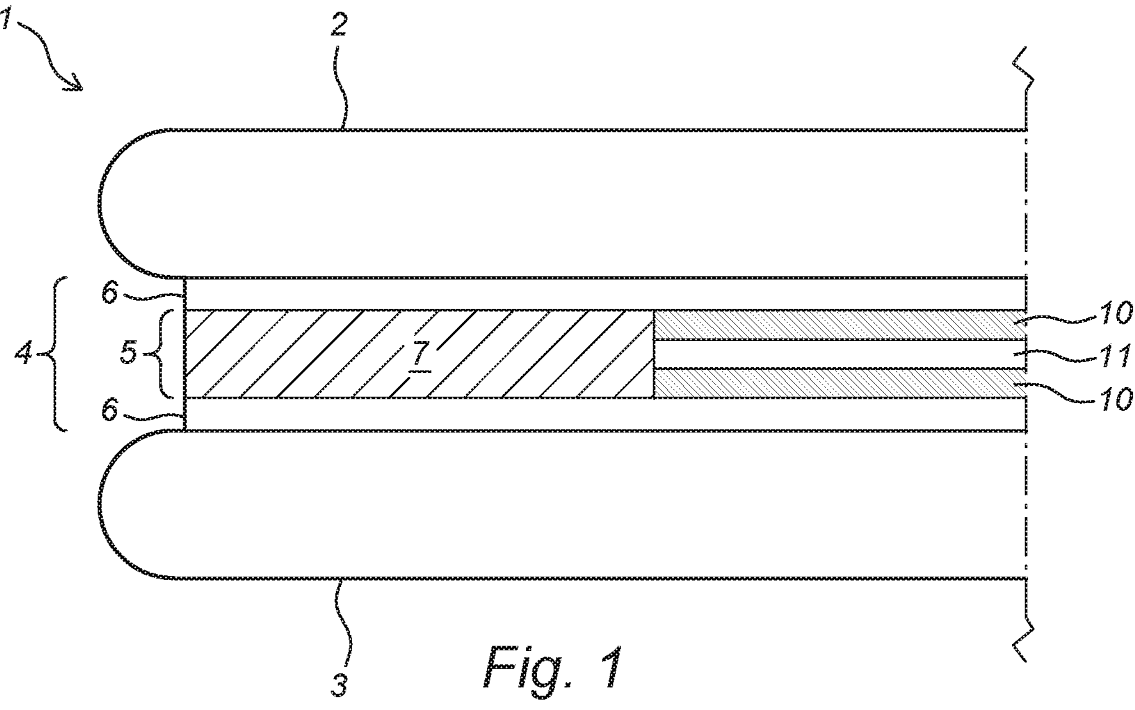
FIG. 1 shows a part of a cross-section of an automotive window laminate structure according to the prior art.

FIG. 1 shows an example of a part of an automotive window laminate structure 1 according to the prior art. The automotive window laminate 1 comprises a first sheet of glass 2 and a second sheet of glass 3, both parallel and mutually spaced apart. Between the first and second sheet of glass 2, 3 a thermoplastic laminated sheet structure 4 is allocated. Said laminated sheet structure 4 being formed by two bonding layers 6, and one functional layer 5 between these bonding layers 6. The functional layer 5 comprises two thermoplastic layers 10 and one film layer 11. As shown, the two bonding layers 6 extend further towards the edges of the glass sheets 2, 3. In the opening/space between the two bonding layers 6, there where they extend beyond the functional layer 5, a separate encapsulation layer 7 is positioned. The function of said encapsulation layer 7 is to keep the functional layer 5 in position during manufacturing of the window laminate structure 1. To maintain the position of the functional layer 5 in relation to the edges of the glass sheets 2, 3.

Figure 2:
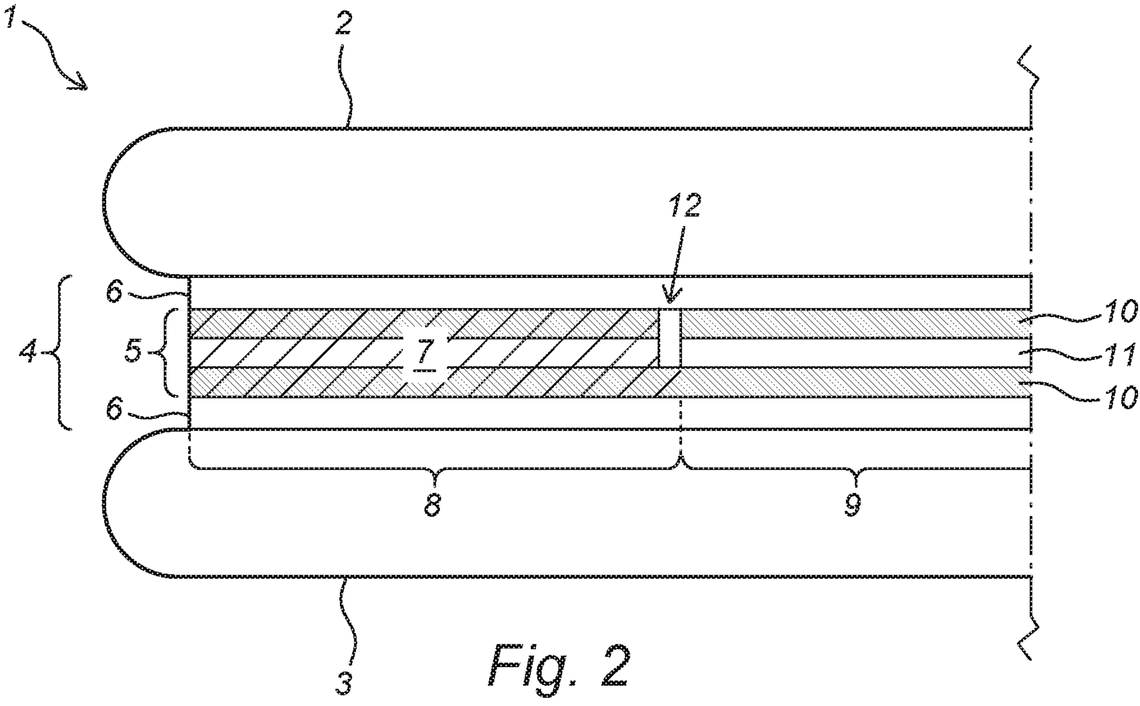
FIG. 2 shows a part of a cross-section of a first embodiment according to the present invention.

FIG. 2 shows a non-limitative embodiment of an automotive window laminate structure 1 according to the present invention. Between a first and second sheet of glass 2, 3, a thermoplastic laminated sheet 4 is allocated. The laminated sheet 4 comprises one functional layer 5, wherein the functional layer 5 on its upper and lower surface is (substantially) entirely covered by at least two bonding layers 6. The functional layer 5 comprises an inactive portion 8 and an active portion 9. The inactive portion 8 and active portion 9 are integral portions of the functional layer 5. An encapsulation layer 7 is provided to keep the active portion 9 of the functional layer 5 in position. The encapsulation layer 7 is in this non-limitative embodiment formed out of the inactive portion 8 of the functional layer 5. This eliminates the use of a separate encapsulation layer 7, which may speed up the production process significantly. Moreover, the inactive portion 8 is made inactive by a cut-out portion 12 of the functional layer 5. The cut-out portion 12 may for example be cut out of the functional layer 5 through a laser cut. The thermoplastic layers 10 have on their respective surfaces facing towards the film 11, a conductive coating. The cut-out 12 in the functional layer 5 locally destructs the conductive coating of at least one of the thermoplastic layers 10, but can also be used to connect two opposite facing coatings to each other by said cut-out 12. The thermoplastic laminated structure 4 is convenient in use since it prevents the necessity of using a separate encapsulation layer 7, which requires a precise placement with respect to the functional layer 5. A slight overlap between the two may result in a local crack, rupture, or breakage of the glass sheets 2, 3. According to the present invention the encapsulation layer 7 is an integrated layer, which may eliminate the requirement of a precise placement of the encapsulation layer 7 in relation to the functional layer 5, as they are integrally formed. As such, with the placement of merely the functional layer 5 is sufficient, and this thus eliminates the necessity of precise and accurate positioning of a frame layer around the functional layer 5. That may be realized since the encapsulation layer 7 is integrally formed as the inactive portion 8 of the functional layer 5. Hence, said inactive portion 8 allows for the active portion 9 to retain its position between the sheets of glass.

Figure 3:
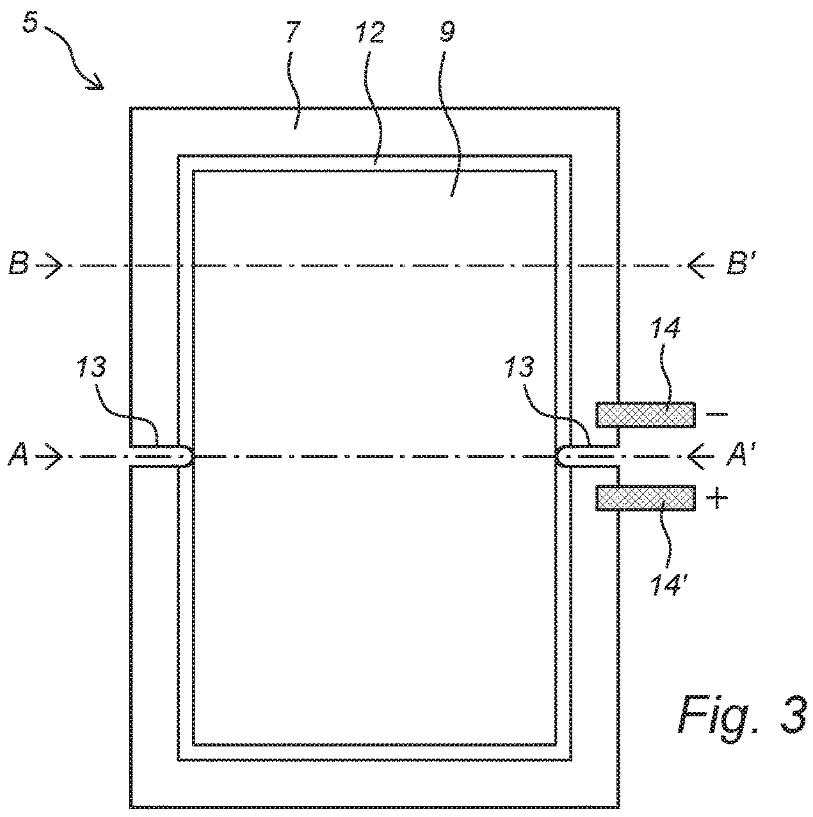
FIG. 3 shows a top-view of an embodiment of the thermoplastic laminated sheet structure.

FIG. 3 shows a top view of the functional layer 5 according to the present invention. As schematically indicated, the cut-out 12 extends around the entire active portion 9 of the functional layer 5. As such, the cut-out 12 is allocated between the active portion 9 and the encapsulation layer 7. The encapsulation layer 7 is in this non-limitative embodiment therefore substantially entirely formed by an inactive portion 8 of the functional layer 5. That is, since the cut-out 12 defines a sort of frame in this perspective, the interior portion of the frame remains active, which is referred to as the active portion 9, and wherein the exterior portion of the frame is made unactive by the cut-out 12. That is, as explained, because one of the two exterior thermoplastic layers is cut, therewith cutting through a conductive coating, or layer, thereon, and hence, deactivating the exterior portion of the frame. Two power connections 14, 14' are depicted on one side of the functional layer 5 in this figure. Where according to the prior art it is required to place said power connections, which may be composed out of any conducting material, must be deposited on opposite sides, the present invention allows for a more convenient placement on the same side. This is realized by two cut-out notches 13 in the functional layer 5, in contrary to the cut-out 12, which only cuts out one or two layers, the cut-out notch 13 locally remove the entire functional layer 5. The cut-out must at least extend from the perimeter of the encapsulation layer 7 to the cut-out 12. As such, an anode side and cathode side may be formed in the functional layer 5. Here, the anode and cathode sides are located above and below the fictive line extending between the two cut-out notches 13. Since one power connection is provided on either side of the cut-out notch 13 on one side of the functional layer, this allows for easy connection between the sheets of glass. That is mainly because the power connections 14, 14' are on the same side, since this may prevent the need for electric connections on multiple sides of the laminated glass structure. But it also prevents for flipping the functional film during manufacturing thereof, as all difficult cutting, in particular all laser actions can be done from one side, and thus allows for easier and better controlled production. The latter benefit applies to the present invention in general if the power connections are on the same side of the perimeter, and in particular on the same thermoplastic layer of the functional layer 5. The fictive line between the two cut-out notches 13 is also indicated by the line A-A', which will be elaborated together with line B-B' in FIGS. 4*b* and 4*a* respectively.

Figure 4A:
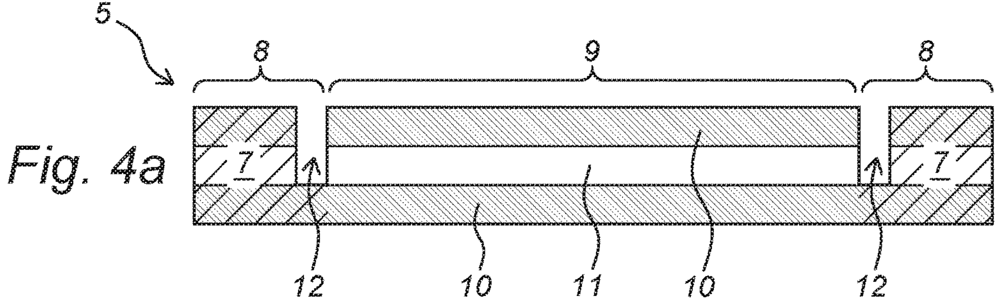
FIGS. 4*a* and 4*b* show two cross-sections of the thermoplastic laminated sheet structure of FIG. 3.
Figure 4B:
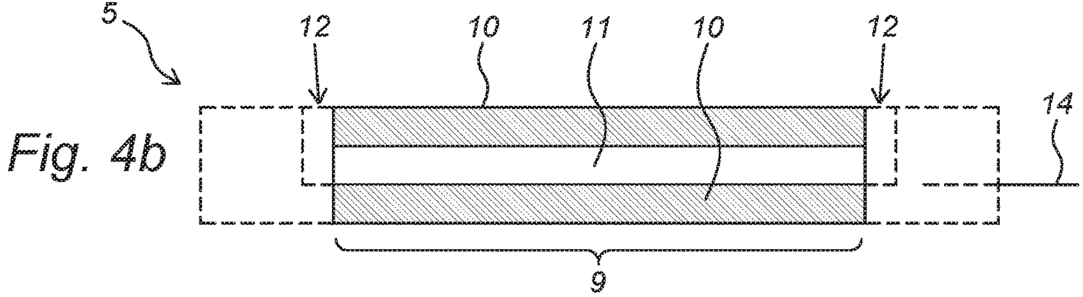

FIG. 4*a* shows a cross-sectional view over line B-B' in FIG. 3. FIG. 4*b* shows a cross-sectional view over line A-A' in FIG. 3. As clearly visible from FIG. 4*a*, the cut-out 12 extends from the top thermoplastic layer 10, until the film layer 11. As such, the conductive coating or layer that is provided on the side of the top thermoplastic layer 10 facing towards the bottom thermoplastic layer 10 is broken. As such, an inactive portion 8 of the functional layer 5 is formed. Simultaneously this inactive portion 8 fulfils the function of the encapsulation layer 7. Hence, the encapsulation layer is integral part of the functional layer 5, integral part of the active portion 8 of the functional layer 5. FIG. 4*b* also indicates the presence of a connector 4. Since the line A-A' extends through the cut-out notches 13, these parts are schematically indicated by the dashed lines. Also, the cut-out 12 is only indicated by dashed lines, since in this cross-section only the active portion 9 of the functional layer 5 is present. Since one connector 14 is provided in a region laying more towards the viewer (that is, in the direction extending from the paper), and a second connector 14 is provided in a region laying more away from the viewer (that is, in the direction extending in the paper), the anode and cathode side of the functional layer 5 may be defined. Said anode and cathode side are mutually separated by the cut-out notch 13. This allows the connectors 14 to be placed along the same side of the functional layer 5, which is more convenient for layer connecting the functional layer to the power supply of the car when the automotive window is placed in the car.

Figures 5A, 5B:
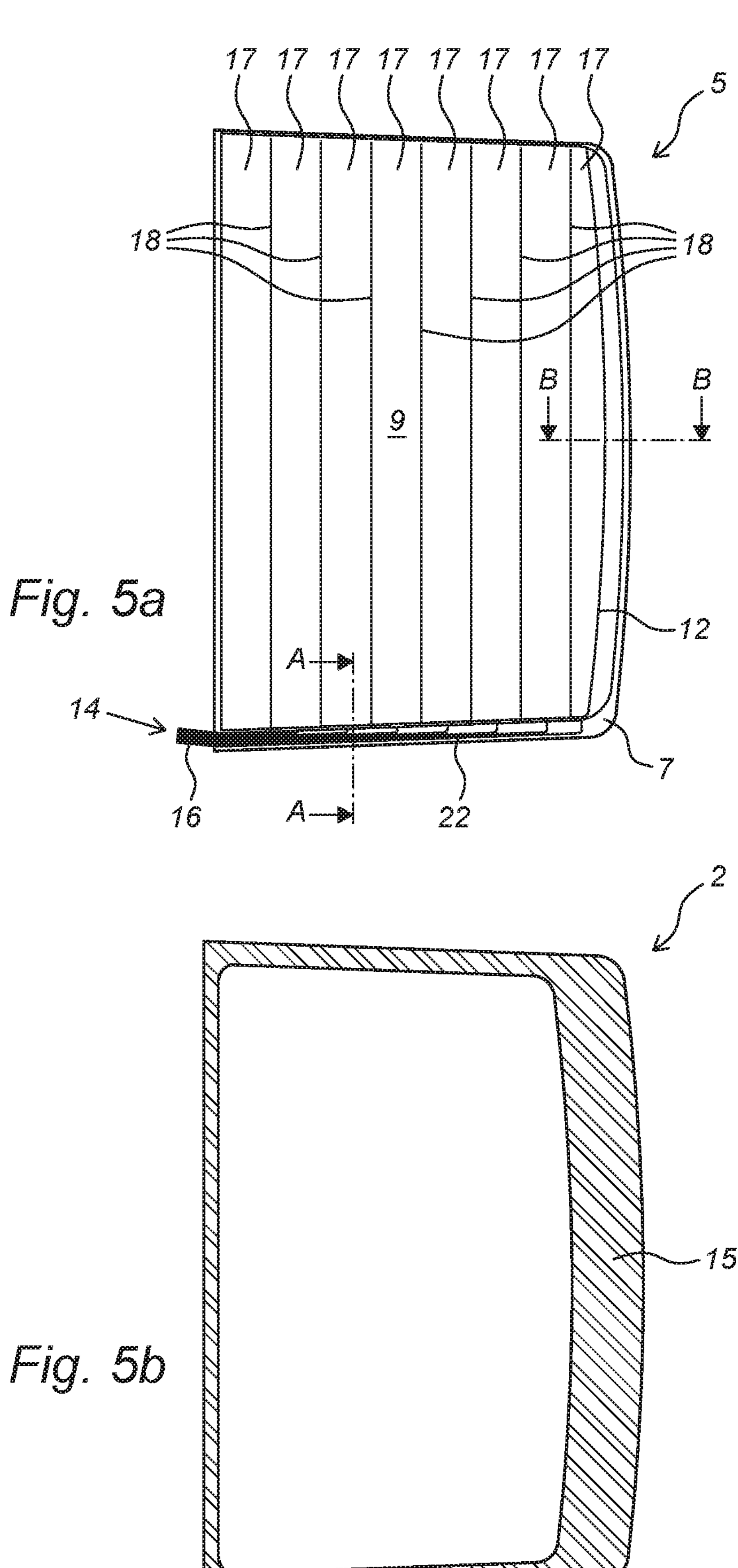
FIGS. 5*a* and 5*b* show respectively a top view of the thermoplastic laminated sheet structure according to a different embodiment and an automotive window sheet.

FIGS. 5*a* and 5*b* show a different embodiment according to the present invention. FIG. 5*a* shows a functional layer 5 comprising a plurality of active segments 17. Hence, the active portion 9 of the functional layer 5 is composed out of said segments 17. The segments are mutually separated by cutlines 18. Said cutlines 18 are extremely thin, and therefore barely obstruct the view through said functional layer 5. The cutlines 18 cut through the conductive layer (not shown) of one of the thermoplastic layers, such that the active surfaces 17 are each mutually electrically separated, or at least their respective conductive coatings are mutually separated. As such, a single conductive circuit 16 may be used to separately connect each of the active segments 17. The conductive circuit 16 is preferably provided on an inactive portion 7 of the functional layer 5. Preferably on a thermoplastic layer, or more in particular partly on the conductive layer of said thermoplastic layer that extends beyond the active portion 9 of the functional layer 5. FIG. 5*b* shows a sheet of glass 2, wherein said sheet of glass 2 is provided with a black masking portion 15. Preferably, said masking portion is sufficiently large to cover at least a part of the inactive portion 7 of the functional layer 5, preferably entirely with the exception for a portion of the inactive portion 7 that is used as a substrate for one or more connectors 14, which comes out of the laminated structure. Moreover, said masking portion 15 may also cover the conductive circuit 16 which connects the active segments 17 electrically to a power supply. The inactive portion 7 of the functional layer 5 provides to be a substrate for one or more tracks 22 or conductive circuits 22. Said tracks 22 or conductive circuits 22 preferably connect the power source 14 or connector 14 to the independent active segments 17. As can be seen, all the tracks 22 or conductive circuits 22 are on one side of the perimeter of the functional layer 5 which provides for an efficient connection. Moreover, the connections 22 are also on the same surface of the thermoplastic layer 10 (as shown in more detail in FIG. 7) which provides for a very efficient manufacturing.

Figure 6:
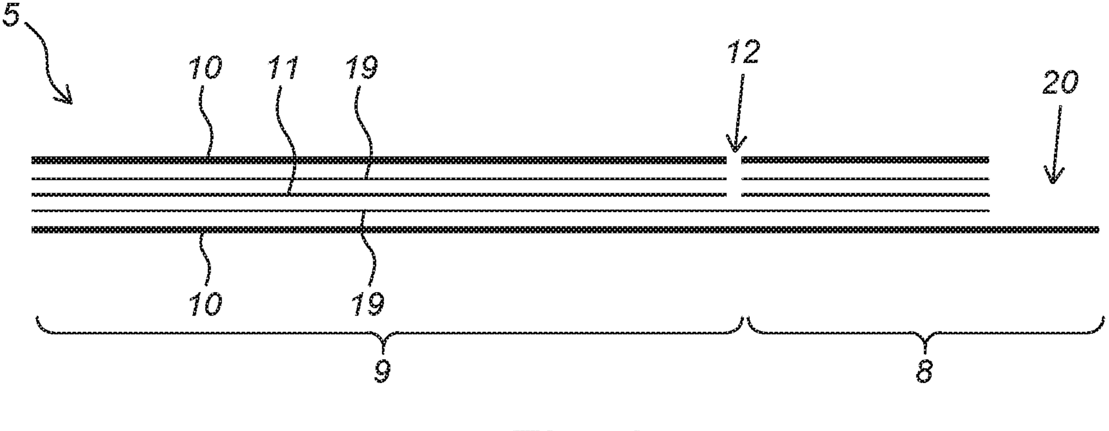
FIG. 6 shows a cross-section of the thermoplastic laminated sheet structure of FIG. 5*a;*

FIG. 6 shows a cross-section of the functional layer 5 along section B-B as indicated in FIG. 5*a*. Here the functional layer 5 is shown in exploded view for sake of clarity. As indicated, the functional layer 5 comprises an active portion 9 and an inactive portion 8, mutually separated by a cut-out portion 12. The functional layer 5 itself comprises two thermoplastic layers 10, wherein the sides of both thermoplastic layers 10 facing towards each other are provided with a conductive coating 19. Between the conductive coatings 19 a film layer 11, such as a switchable film 11, is provided. The inactive portion 8 of the functional layer 5 is provided with a cascaded segment 20. That is, the bottom thermoplastic layer 10 extends beyond the perimeter of the film layer 11 and also the other thermoplastic layer 10. Locally at least the top thermoplastic layer 10, the conductive coating 19 connected to the top thermoplastic layer 10, and the film layer are deleted, however it is preferred that also the conductive coating 19 of the lower thermoplastic layer 10 in the region of the cut-out portion 12 is removed. This may be realized by means of a laser cut that is applied in a direction perpendicular to the functional layer 5. In this embodiment also the lower conductive coating 19 is removed in the region of the cascaded segment 20. Said cascaded segment 20 may form a portion of a substrate 20. Said substrate 20 may be provided with a conductive circuit and/or tracks such as to provide power to the active surfaces 17. This substrate is in particular suitable to this end, since it is essentially free of the conductive coating 19, which could otherwise cause the tracks or conductive circuits on the substrate 20 to cause electric shortage.

Figure 7:
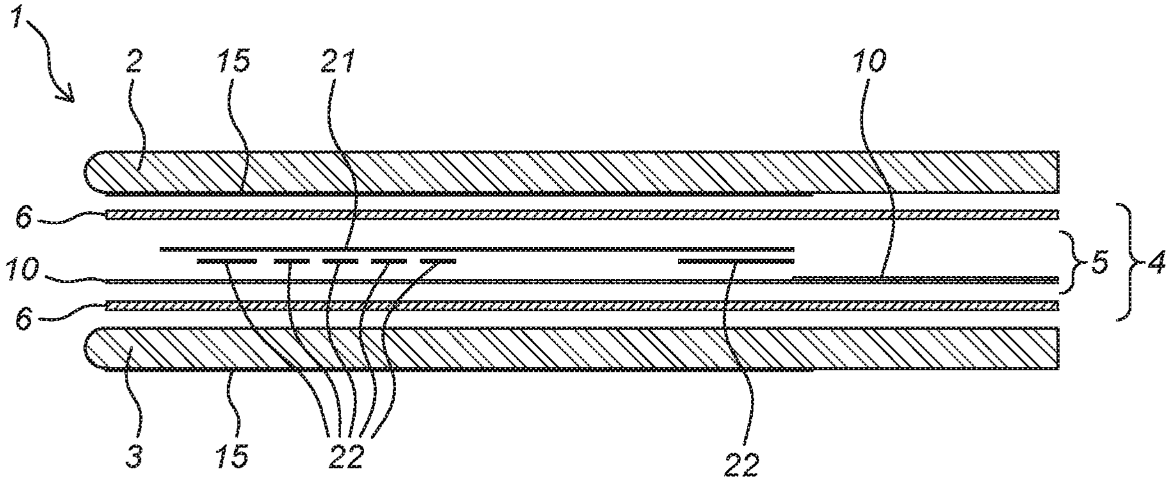
FIG. 7 shows a cross section of the automotive window laminate structure according to a FIG. 5*a*.

FIG. 7 shows a part of the automotive window laminate structure, in particular along section A-A as indicated in FIG. 5*a*. Here, the top and bottom glass sheet 2, 3 are shown. Both top and bottom sheet of glass 2 are provided with a black masking portion 15 The bonding layers 6 extend essentially entirely towards the perimeter of the sheets of glass 2. The functional layer 5 is, in the same way as shown in FIG. 6, provided with a cascaded portion. Said cascaded portion is formed by the bottom thermoplastic layer 10 that extends beyond the perimeter of the film layer (not shown here) and the top thermoplastic layer 10. Although it is preferred that the bottom thermoplastic layer 10 is extending beyond the top thermoplastic layer 10, the present invention is not limited thereto. In this embodiment the bottom thermoplastic layer 10 extends essentially up to the perimeter of the bottom bonding layer. On top of the bottom thermoplastic layer 10, there where it extends beyond the film and top thermoplastic layer 10, a conductive circuit is present. Said conductive circuit comprises a plurality of conductive portions 22, wherein one portion 22 may form the anode, and the other portions the cathodes connected to the active segments 17 of the functional layer 5. Hence said conductive portions 22 form a conductive circuit 22, in particular a printed circuit. It is also visible that the lower thermoplastic layer 10 (although this may, when the window is flipped, be the upper one) extends beyond the functional layer 5, in particular the switchable film that is situated therebetween. Preferably, this portion of the lower thermoplastic layer 10 that extends beyond is at least partially free of conductive coating, in particular free of ITO coating. This prevents that the conductive circuit 22 cause electric shortage, hence they are electrically separated. This orientation, wherein the conductive circuits 22, which may also be referred to as tracks 22, allows the connections to be on one side of the perimeter of the functional layer 5. This allows for each of the tracks 22 to connect to an active segment 17 of the window and to provide said active segment 17 with power.

Figure 8:
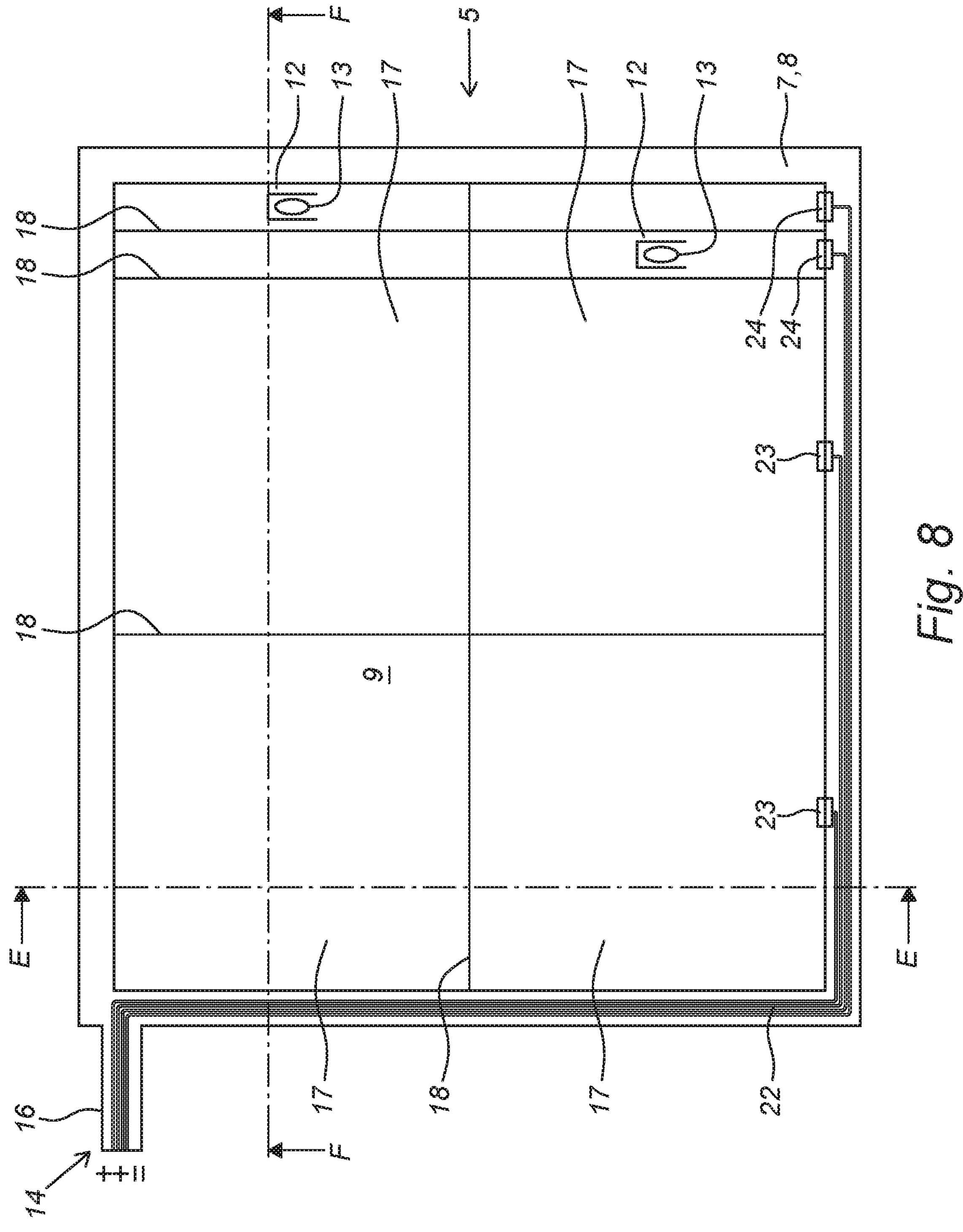
FIG. 8 shows a top view of the window laminate according to a different embodiment.

FIG. 8 shows a top-level overview according to a simplified illustration to a different embodiment of the present invention. The functional layer 5 as shown in this figure comprises a plurality, in particular four, of active segments 17. Preferably, each of said active segments 17 is individually switchable. According to this particular embodiment the active segments 17 are oriented in a pixel like fashion, but it is conceivable that different orientations, such as different sizes is applied. The encapsulation layer 7 is in this embodiment substantially entirely formed by an inactive portion 8 of the functional layer 5. Preferably, the conductive coating 19 (FIGS. 9 and 10) that may be applied onto the thermoplastic layers is at least partially removed from and/or not applied on and/or insulated on the inactive portion, as will be discussed in more detail with respect to FIGS. 9 and 10. The functional layer 5 comprises one or more connectors 23, 24, or conductive circuits 23, 24, which allows the active segments 17 to be, preferably electrically, connected to a power connection 14. Said one or more connectors 23, 24, or conductive circuits 23, 24 are connected electrically to a number of conductive circuits 22 and/or tracks 22 that are provided onto the inactive part 8 of the functional layer 5. It is imaginable that the one or more connectors 23, 24, or conductive circuits 23, 24 are formed by a portion of conductive material that extends beyond the switchable film 11 partially, wherein the conductive circuits 22 or tracks 22 preferably attach to said conductive material extending beyond the switchable film 11. Here two connectors 23 or conductive circuits 23 are provided for providing electric power to two vertical columns (in this particular orientation), whereas two connectors 24 or conductive circuits 24 are provided for providing electric power to two horizontal rows (in this particular orientation). It is clear to those skilled in the art that the term horizontal and vertical rows and columns is merely used for illustrative purposes and may be different. Various aspects of this embodiment will be elaborated in more detail with respect to the cross sections along line E-E, and F-F.

Figure 9:
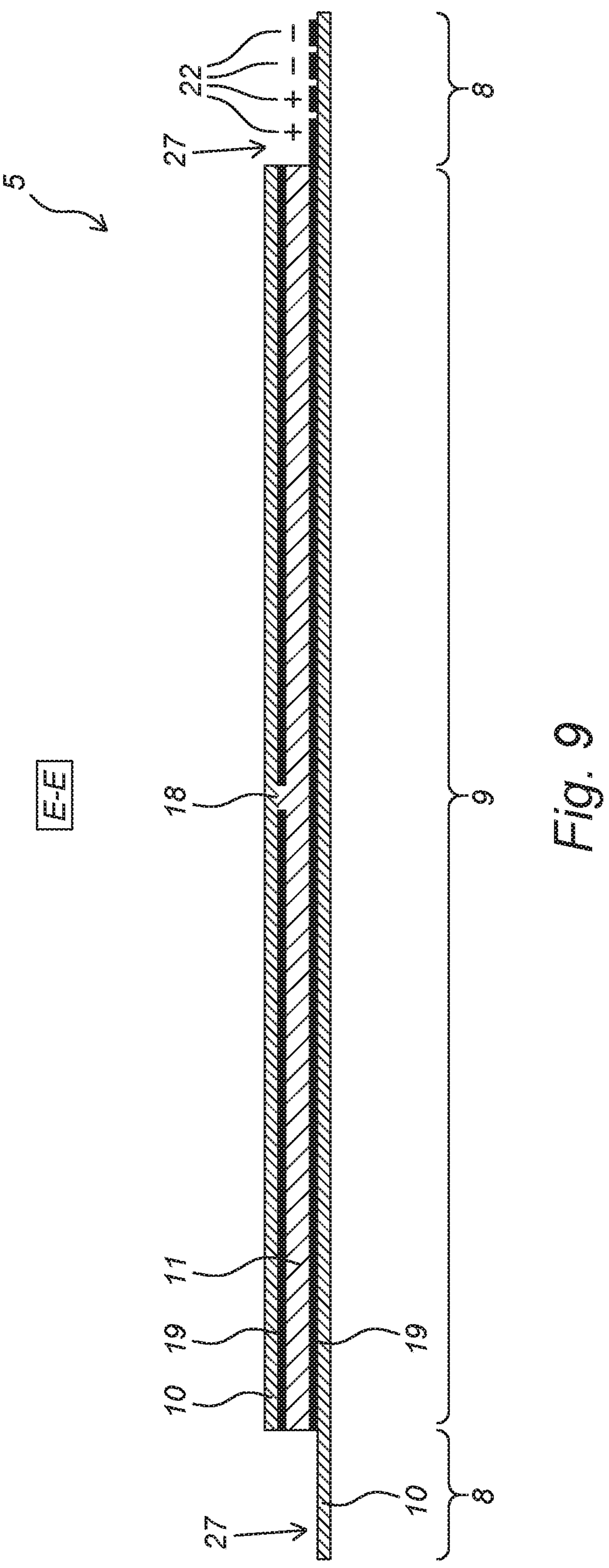
FIG. 9 shows a cross section of line E-E as shown in FIG. 8.
Figure 10:
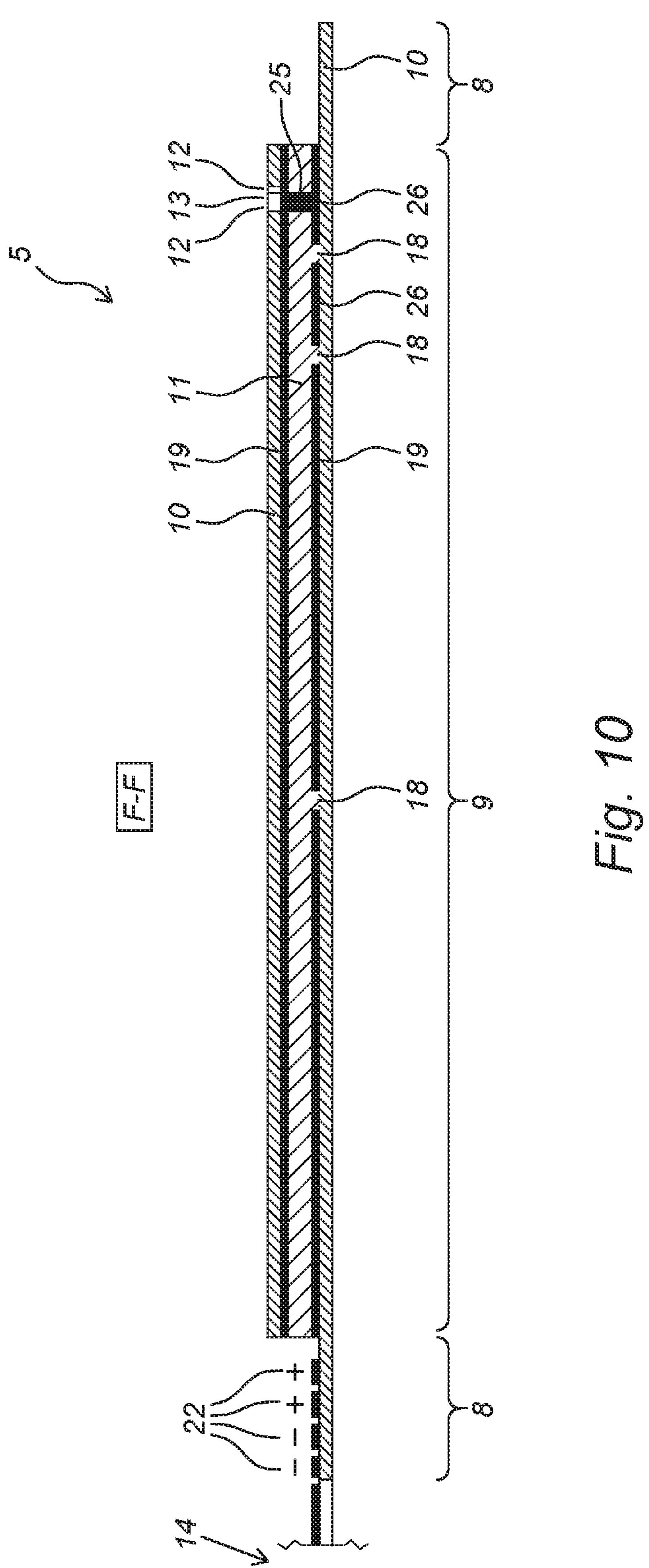
FIG. 10 shows a cross section of line F-F as shown in FIG. 8.

FIG. 9 shows the cross section of the functional layer 5 along line E-E as indicated in FIG. 8. Here the active portion 9 and the inactive portion 8 of the functional layer 5 are indicated. The inactive portion 8 is formed by one of the thermoplastic layers 10 of the functional layer 5. Said inactive portion formed by thermoplastic layer 10 is, at least on an inwardly facing surface 27 which in this figure reflects the upper surface 27, free of conductive coating 19, as is shown in the figure. However, it is also conceivable that said inwardly facing surface 27 is provided with insulating material, such as to provide for a non-conductive inwardly facing surface 27. The inactive portion 8 is in this case formed by locally removing one thermoplastic layer 10, the conductive coatings 19 of both thermoplastic layers, and the switchable film 11. The figure also indicates a cutline 18 present in the upper conductive coating 19. Said cutline electrically separates the conductive coating 19 on said upper thermoplastic layer 10 such as to form two separated surfaces of conductive coating 19. Since both of said surfaces, each comprise their own electronic connection (FIG. 8) it is possible to control those separately. The figure also shows a number of tracks 22 or printed conductive circuits 22 provided on the inactive portion 8 of the functional layer 5, in particular on the inwardly facing surface 27. Since this portion 8, in particular the inwardly facing surface 27, is essentially free of conductive coating 19 and/or provided with insulating material, it is possible to provide said tracks 22 or conductive circuits 22 thereon without creating electric shortage. Said tracks 22 or conductive circuits 22 provide electric power towards the anodes and cathodes. FIG. 10 shows a cross section of the functional layer 5 along segment F-F, which is substantially perpendicular to segment E-E. This figure indicates the active portion 9 and the inactive portion 8 of the functional layer 5 as well. However, contrary to FIG. 9, here the cutlines 18 are provided into the conductive coating of the bottom thermoplastic layer 10. By applying cutlines 18 in both the upper conductive coating 19 (FIG. 9) as well as the lower conductive coating 19 as shown in this figure, it becomes possible to generate a matrix of switchable active segments 17 (FIG. 8). This figure shows three cutlines 18, which provide for four separated surfaces 26 of conductive coating 19. The two surfaces 26 on the right side are configured for providing electric power towards the two horizontal rows of active segments 17 as shown in FIG. 8. This is possible since the two connectors 24 that connect to these two right most surfaces 26 of conductive coating 19 are connected, via a lateral conductor 25, to the upper conductive coating 19. If three or more horizontal rows are to be provided for, the number of narrow conductive surfaces 26 on the right side is to be increased as well. The lateral conductor 25 may be formed by means of a conductive material which connects the lower conductive coating 19 to the upper conductive coating 19 of the two thermoplastic layers 10. The lateral conductor 25 allows for having anode and cathode on the same side of the functional layer and provides for single side production methods.

The above-described inventive concepts are illustrated by several illustrative embodiments. It is conceivable that individual inventive concepts, including inventive details, may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application and/or alternative embodiment.

The ordinal numbers used in this document, like "first", "second", and "third" are used only for identification purposes. Hence, the use of expressions like a "second" component, does therefore not necessarily require the co-presence of a "first" component.

The invention claimed is:

1. An automotive window laminate structure, comprising:
- a first glass sheet, and a second glass sheet, said first and second glass sheet are parallel and mutually spaced apart,
- a thermoplastic laminated sheet structure, said laminated sheet structure placed between the first and second glass sheet, said laminated sheet structure comprising;
- at least one functional layer, having an upper and lower surface,
- at least two bonding layers, wherein the at least two bonding layers at least partially cover the upper and lower surfaces of the at least one functional layer, wherein a portion of the bonding layers extends beyond a portion of the perimeter of the functional layer;
- an encapsulation layer, at least partially located between the first and second glass sheet, which encapsulation layer extends along at least a portion of the perimeter of the functional layer,
- wherein at least a part of the encapsulation layer is formed by an inactive portion of the functional layer.

2. The automotive window laminate structure according to claim 1, wherein the encapsulation layer is entirely formed by the inactive portion of the functional layer.

3. The automotive window laminate structure according to claim 1, wherein the bonding layers are at least partially composed out of Polyvinyl Butyral (PVB) and/or Thermoplastic Urethane.

4. The automotive window laminate structure according to claim 1, wherein the at least one functional layer comprises at least two thermoplastic layers, and at least one film layer between the at least two thermoplastic layers.

5. The automotive window laminate structure according to claim 4, wherein at least a part of at least one thermoplastic film extends beyond the perimeter of the at least one film layer.

6. The automotive window laminate structure according to claim 4, wherein the thermoplastic layer is at least partially composed out polyethylene terephthalate (PET), or polyethylene naphthalate (PEN), or Tri Acetate Cellulose (TAC) or Poly methyl methacrylate (PMMA).

7. The automotive window laminate structure according to claim 4, wherein the at least one film layer is a polymer-dispersed liquid-crystal device, and/or a suspended-particle device, and/or an electrochromic device, and/or micro-blinds.

8. The automotive window laminate structure according to claim 4, wherein at least one side of at least one thermoplastic layer is provided with a conductive coating.

9. The automotive window laminate structure according to claim 4, wherein the inactive part of the functional layer is formed by a cut-out portion of the at least one film layer and/or the at least one thermoplastic layer and/or a conductive coating of the thermoplastic layer.

10. The automotive window laminate structure according to claim 1, wherein the inactive portion of the functional layer is an integral part of the functional layer.

11. The automotive window laminate structure according to claim 1, wherein the encapsulation layer extends along the entire perimeter of the functional layer, and/or wherein the at least two bonding layers extend beyond the perimeter of a part of the functional layer along the entire perimeter of the functional layer.

12. The automotive window laminate structure according to claim 1, wherein the encapsulation layer at least partially fills a space between the bonding layers stretching along the perimeter of the functional layer where the bonding layers extend beyond said perimeter, and/or wherein at least a part of the thickness of the encapsulation layer is equal to the thickness of at least a part of the functional layer.

13. The automotive window laminate structure according to claim 1, wherein a part of the inactive portion of the functional layer forms a connector, for providing power to the functional layer, wherein the anode and cathode are provided on the same side of the functional layer.

14. The automotive window laminate structure according to claim 1, wherein a conductive circuit is electrically connected to the functional layer of the thermoplastic laminate via at least one connecting part.

15. The automotive window laminate structure according to claim 1, wherein the functional layer comprises at least two active segments.

16. The automotive window laminate structure according to claim 14, the at least two active segments allowing each active segment to be selectively electrically connected to the conductive circuit.

17. The automotive window laminate structure according to claim 14, wherein a non-conductive layer is provided on top of the conductive circuit.

18. The automotive window laminate structure according to claim 1, wherein at least one bonding layer seals at least a part of the functional layer.

19. A thermoplastic laminated sheet structure as defined in claim 1 for use in an automotive window laminate structure.

20. A transport vehicle, or a truck, provided with an automotive window laminate structure according to claim 1.

* * * * *